United States Patent
Kim et al.

(10) Patent No.: US 6,542,209 B2
(45) Date of Patent: Apr. 1, 2003

(54) COLOR FILTER OF LIQUID CRYSTAL DISPLAY AND METHOD OF FABRICATING THE SAME

(75) Inventors: Woo Hyun Kim, Seoul (KR); Woong Kwon Kim, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/891,506

(22) Filed: Jun. 27, 2001

(65) Prior Publication Data

US 2002/0018159 A1 Feb. 14, 2002

(30) Foreign Application Priority Data

Jul. 3, 2000 (KR) .............................. 00-37708

(51) Int. Cl.$^7$ ............................ G02F 1/1335
(52) U.S. Cl. ................ 349/106; 349/113; 349/114
(58) Field of Search ................ 349/106, 114, 349/113

(56) References Cited

U.S. PATENT DOCUMENTS

| | | | | |
|---|---|---|---|---|
| 4,600,273 A | * | 7/1986 | Ohno | 350/336 |
| 5,891,597 A | * | 4/1999 | Lee | 430/7 |
| 6,215,538 B1 | * | 4/2001 | Narutaki et al. | 349/106 |
| 6,383,694 B1 | * | 5/2002 | Wu et al. | 430/7 |

* cited by examiner

*Primary Examiner*—Robert H. Kim
*Assistant Examiner*—Thoi Duong
(74) *Attorney, Agent, or Firm*—Morgan, Lewis & Bockius LLP

(57) ABSTRACT

A color filter of a liquid crystal display and method of fabricating the same is disclosed in the present invention. More specifically, a color filter of a liquid crystal display includes a glass substrate, a color resin layer on the glass substrate, and a transparent electrode over the color resin layer, wherein the color resin layer has transmission and reflection sections, and the reflection section has first and second portions, wherein the first portion is patterned and the second portion is not patterned, thereby controlling a quantity of light passing through the treflection section.

18 Claims, 5 Drawing Sheets ic COLOR FILTER OF LIQUID CRYSTAL
DISPLAY AND METHOD OF FABRICATING
THE SAME

This application claims the benefit of Korean Application No. 10-2000-37708 filed Jul. 3, 2000, which is hereby incorporated by reference.

BACKGROUND OF THE INVENTION

1. Field of the Invention

The present invention relates to a liquid crystal display, and more particularly, to a color filter of a liquid crystal display and method of fabricating the same. Although the present invention is suitable for a wide scope of applications, it is particularly suitable for simplifying the fabricating process of the color filter and improving characteristics in color and brightness.

2. Discussion of the Related Art

A liquid crystal display can be manufactured in various sizes. Thus, the liquid crystal display have been employed in various display devices from a small sized display device such as a watch, a calculator, and a portable terminal, to a large sized display device such as a monitor of a computer and a television.

Further, in comparison with other devices, the liquid crystal display consumes relatively a small electric power, and it is relatively easy to be carried. Consequently, the liquid crystal display has several advantages among display devices.

Among the conventional display devices, a cathode ray tube (CRT) is a device for accelerating electrons to collide with phosphor ions on a screen to emit light. Images are displayed on the screen. However, the CRT consumes a high electric power and requires a space for accelerating the electrons, so that a volume of the CRT is relatively large. On the other hand, as an alternative to the CRT, the liquid crystal display is the most commonly used as a display device due to its small consumption of electric power and its various sizes.

The liquid crystal display device is a display device utilizing a liquid crystal, which has an intermediate characteristic between a solid and a liquid. An arrangement in the liquid crystal is changed according to the change of the voltage applied thereto. Therefore, the arrangement of the liquid crystal is adjusted to change a degree of transmission of light at the portion in the liquid crystal display by properly adjusting a voltage applied to a specific portion of the liquid crystal. As a result, a division of light and darkness is generated therein, thereby displaying desired images on the screen.

In case of displaying colors in the liquid crystal display, a transmission rate of the white light through the liquid crystal is adjusted. Thus, desired colors are displayed by means of an additive mixture of three primary colors generated by the light through red, green, and blue color filters. In this case, the adjustment of the transmission rate of the light through the liquid crystal is carried out by changing an intensity of the electric field between the opposite ends of the liquid crystal through adjusting a voltage.

In a half reflection and half transmission type color liquid crystal display, an image is displayed by means of the light emitted from a backlight and the light incident to the liquid crystal display from the exterior. In this type of the liquid crystal display, a transmission section displays an image by means of the light emitted from the backlight whereas a reflection section displays an image by reflecting the light incident to the liquid crystal display from the exterior.

FIG. 1 is a cross-sectional view illustrating a color filter of a liquid crystal display in the background art.

Referring to FIG. 1, a color filter in thebackground art includes a glass substrate 101, a color resin layer 102, and a transparent electrode 103. The color resin layer 102 has a transmission section where the light emitted from a backlight passes through while a reflection section where the light incident from the exterior is reflected. The transparent electrode 103 is formed of a conductor to apply a voltage to a liquid crystal cell.

Further, below the reflection section of the color resin layer 102, an acryl resin layer 104 for adjusting a. distance for the light to pass through the color resin layer 102 is formed on the glass substrate 101. A backlight (not shown) is disposed at the close proximity of the transparent electrode 103. The transparent electrode 103 is opposed to a lower plate having a pixel electrode.

In the transmission section of the color filter, the light emitted from the backlight disposed at the close proximity of the transparent electrode 103 successively passes through the transparent electrode 103, the color resin layer 102, and the glass substrate 101 in displaying color images. In this case, a color is expressed by a color contained in the color resin layer 102. Brightness is adjusted by controlling the voltage applied to the corresponding pixel.

In the reflection section of the color filter, the light incident toward the glass substrate 101 passes through the acryl resin layer 104, the color resin layer 102, and the transparent electrode 103. The light is then reflected by a metal portion (not shown) of the pixel electrode disposed at the close proximity of the transparent electrode 103. The reflected light travels through the transparent electrode 103, the color resin layer 102, the acryl resin layer 104, and the glass substrate 101 in displaying color images. A color in the reflection section is also expressed by a color contained in the color resin layer 102, and brightness is adjusted by controlling the voltage applied to the corresponding pixel.

The transmission section and the reflection section usually correspond to a single pixel. As described above, light passes through the color resin layer 102 twice in the reflection section and passes through the color resin layer 102 one time in the transmission section. Therefore, when the reflection section and the transmission section have a thickness the same as the color resin layers, the reflection section has brightness lower than that of the transmission section.

Consequently, the reflection section is formed to have a thickness different from that of the transmission section by forming the acryl resin layer 104 in the reflection section. Thus, a distance for the light to pass through the reflection section is reduced, thereby properly adjusting brightness and color of the reflection section.

The above-mentioned color filter in the background art is fabricated as follows. First, the acryl resin layer 104 is formed on the glass substrate 101. In this process, the acryl resin layer 104 is formed only in the reflection section through a photolithography process step. Thereafter, the color resin layer 102 is formed on the glass substrate 101 having the acryl resin layer 104. The transparent electrode 103 is then formed on the color resin layer 102.

In the color filter of the background art as described above, the acryl resin layer 104 is partly formed on the glass substrate 101 corresponding to the reflection section and then the color resin layer 102 is formed thereon. Thus, there is a disadvantage that an additional step for forming the acryl resin layer 104 is required. Further, since a range for the thickness d of the acryl resin layer 104 is very limited within the range in which the color resin layer 102 is flat, it is very difficult to optimize the characteristics of color and brightness of the reflection section.

SUMMARY OF THE INVENTION

Accordingly, the present invention is directed to a color filter of a liquid display and method of fabricating the same that substantially obviate one or more of problems due to limitations and disadvantages of the related art.

An object of the present invention is to provide a color filter of a color liquid crystal display and method of fabricating the same that simplifies the method of manufacturing the color filter, and that optimizes brightness and color in the liquid crystal display.

Additional features and advantages of the invention will be set forth in the description, which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color filter of a liquid crystal display includes a glass substrate, a color resin layer on the glass substrate, and a transparent electrode over the color resin layer, wherein the color resin layer has transmission and reflection sections, and the reflection section has first and second portions, wherein the first portion is patterned and the second portion is not patterned, thereby controlling a quantity of light passing through the reflection section.

In another aspect of the present invention, a liquid crystal display includes a first glass substrate, a color resin layer on the first glass substrate, an overcoat layer on the color resin layer, a transparent electrode over the color resin layer, wherein the color resin layer has transmission and reflection sections, and the reflection section has first and second portions, wherein the first portion is patterned and the second portion is not patterned, thereby controlling a quantity of light passing through the reflection section, a second glass substrate, a plurality of wirings for a transistor on the second glass substrate, a plurality of pixel electrode on the second glass substrate, and connecting to each wiring, and a plurality of pattern spacer connecting the transparent electrode and the wirings.

In a further aspect of the present invention, a method of fabricating a color filter of a liquid crystal display on a glass substrate, having transmission and reflection sections includes the steps of forming a color resin layer on the glass substrate, patterning the color resin layer of the reflection section to have first and second portions, wherein the first portion is patterned and the second portion is not patterned, thereby controlling a quantity of light passing through the reflection section, forming an overcoat layer on the color resin layer to level the color resin layer, and forming a transparent electrode on the overcoat layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
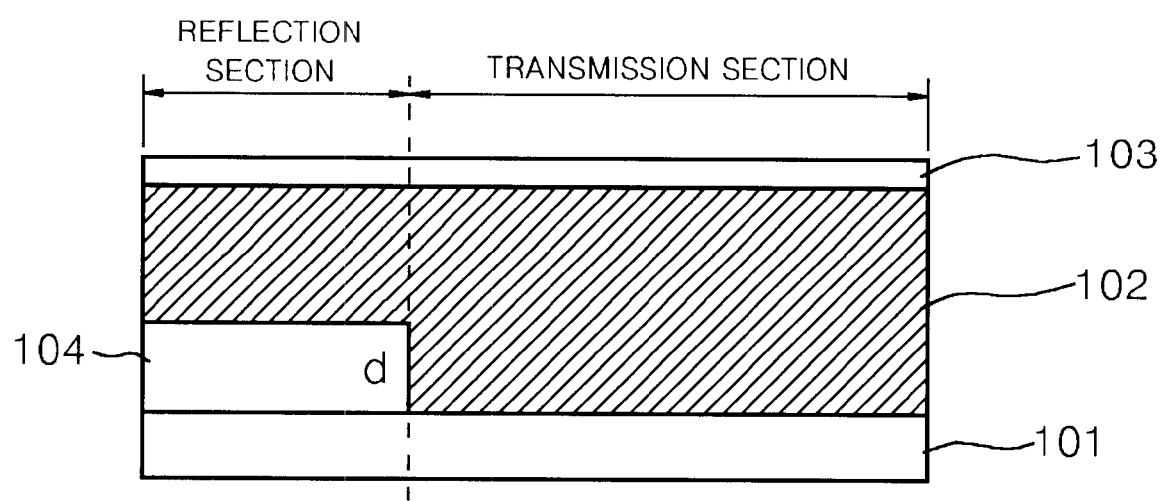
FIG. 1 is a cross-sectional view illustrating a color filter of a liquid crystal display in the background art.
Figure 2A:
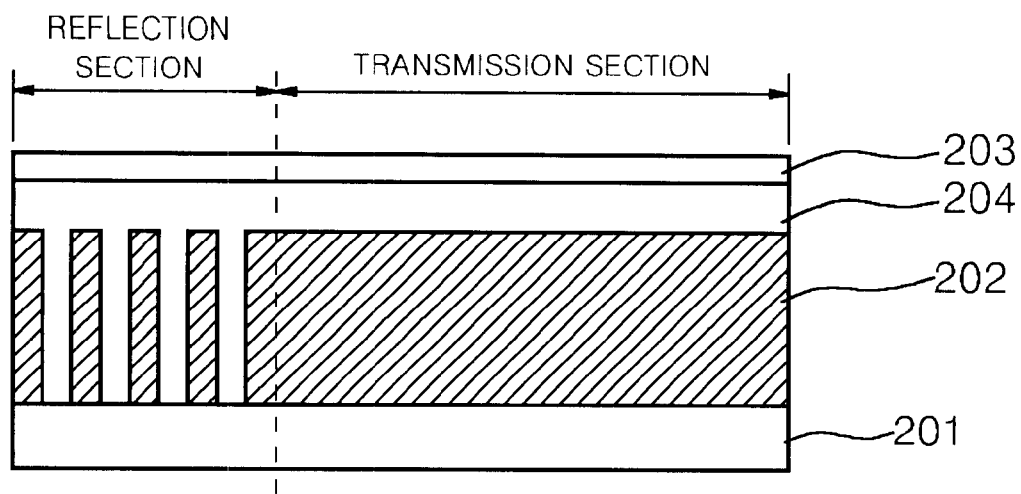
FIGS. 2A and 2B respectively illustrate a cross-sectional view and a plan view of a color filter of a half-reflection-and-half-transmission type liquid crystal display according to a first embodiment of the present invention.
Figure 2B:
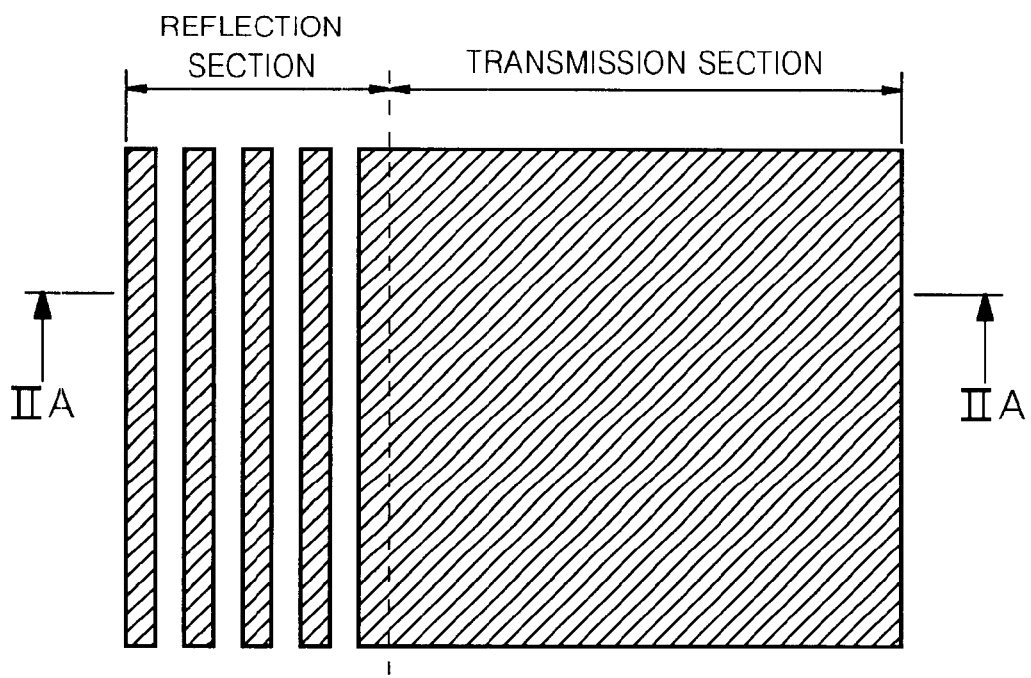

FIGS. 2A and 2B respectively illustrate a cross-sectional view and a plan view of a color filter of a half-reflection-and-half-transmission type liquid crystal display according to a first embodiment of the present invention.

Referring to FIGS. 2A and 2B, the half-reflection-and-half-transmission type liquid crystal display according to the first embodiment of the present invention includes a glass substrate 201, a color resin layer 202, an overcoat layer 204, and a transparent electrode 203.

The color resin layer 202 has a transmission section where light from a backlight (not shown) passes through and a reflection section where light incident from the exterior is reflected. The overcoat layer 204 levels the surface of the color resin layer 202. The transparent electrode 203 is formed of a conductor for applying a voltage to a liquid crystal cell. The reflection section of the color resin layer 202 is formed to have a plurality of grooves therein.

As apparent from FIGS. 2A and 2B, in the color filter according to the first embodiment of the present invention, a thickness of the color resin layer 202 is identical for the transmission and reflection sections. The color resin layer corresponding to the reflection section is patterned to have a plurality of grooves. Thus, the quantity of the light passing through the color resin layer of the reflection section is different in the reflection section. In FIG. 2A, a plurality of the grooves expose the glass substrate 201, it is not required for the embodiment.

Figure 3A:
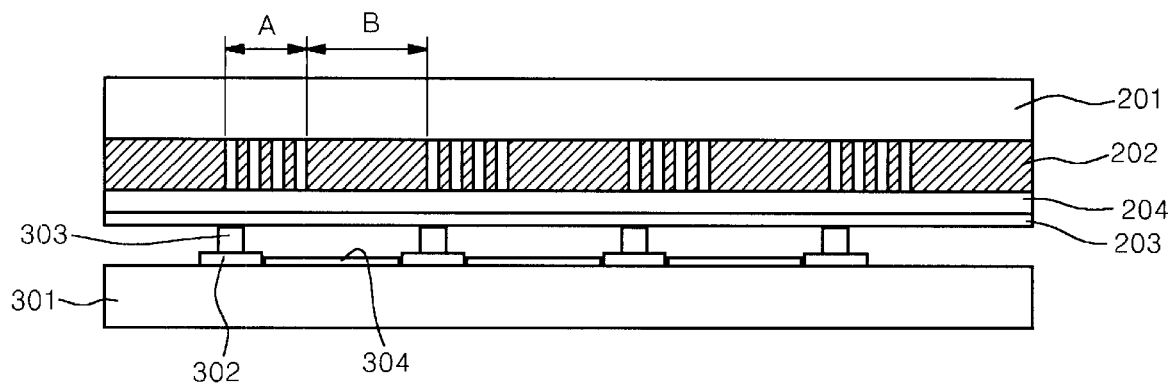
FIGS. 3A and 3B respectively illustrate a cross-sectional view and a plan view of a liquid crystal display employing the color filter of FIGS. 2A and 2B according to the first embodiment of the present invention.
Figure 3B:
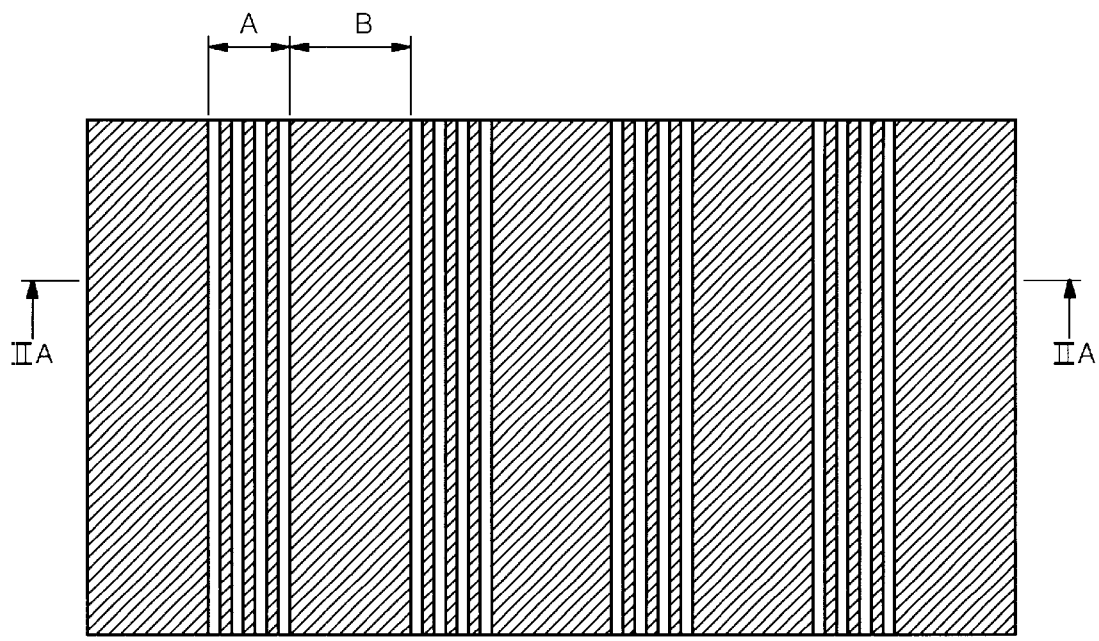

FIGS. 3A and 3B respectively illustrate a cross-sectional view and a plan view of a liquid crystal display employing the color filter of FIGS. 2A and 2B according to the first embodiment of the present invention. As shown in FIGS. 3A and 3B, an upper plate and a lower plate. The upper plate includes the glass substrate 201, the color resin layer 202, and the overcoat layer 204. The lower plate includes a glass substrate 301, a transparent electrode 203, a wiring 302 of transistors, a pattern spacer 303, and a pixel electrode 304. In this case, a reflection section A and a transmission section B of the color filter are located above each pixel electrode 304.

Operation of the color filter of the liquid crystal display will now be described as follows. In the transmission section, light emitted from a backlight (not shown) disposed behind the transparent electrode 203 passes through the transparent electrode 203, the overcoat layer 204, the color resin layer 202, and the glass substrate 201 in displaying images. In this case, a color is expressed by a color contained in the color resin layer 202, and brightness is adjusted by controlling a voltage applied to the corresponding pixel.

In the reflection section, light incident toward the glass substrate 201 passes through the color resin layer 202, the overcoat layer 204, and the transparent electrode 203, and then is reflected by a metal portion of the pixel electrode 304 disposed behind the transparent electrode 203. The reflected light passes through again the transparent electrode 203, the overcoat layer 204, the color resin layer 202, and the glass substrate 201 in displaying images. Similarly, a color is expressed by a color contained in the color resin layer 202, and brightness is adjusted by controlling a voltage applied to the corresponding pixel.

The transmission section B and the reflection section A usually formed in a single pixel. Since the transmission section A and the reflection section B have the color resin layer 202 of the same color, light passes through the color resin layer 202 one time in the transmission section B through the color resin layer 202 twice in the reflection section A.

Therefore, a distance for the light to pass through the color resin layer 202 in the reflection section A is longer than that in the transmission section B. Thus, brightness of the reflection section A is low. In order to overcome this problem, a plurality of grooves is formed in the color resin layer 202 of the reflection section A. The overcoat layer 204 is then filled in the grooves, so that the quantity of the light passing through the color resin layer 202 is reduced. Therefore, brightness and color of the reflection section A are properly adjusted.

As a result, the distance for the light to pass through the color resin layer 202 in the reflection section A is longer than that in the transmission section B, the light passes partly through the color resin layer 202 and partly through the overcoat layer 204. Thus, the quantity of the light passing through the color resin layer 202 in the reflection section A becomes smaller than that of the light passing through the color resin layer 202 in the transmission section B, thereby controlling the characteristics of the reflection section A.

In this case, since the step of forming the color resin layer 202 of the reflection section A to have a plurality of grooves can be simultaneously carried out when red, green, and blue color resins are formed for each pixel, an additional manufacturing step is not necessary. By changing only a design of an exposure mask, the above-described features will be accomplished.

Figure 4A:
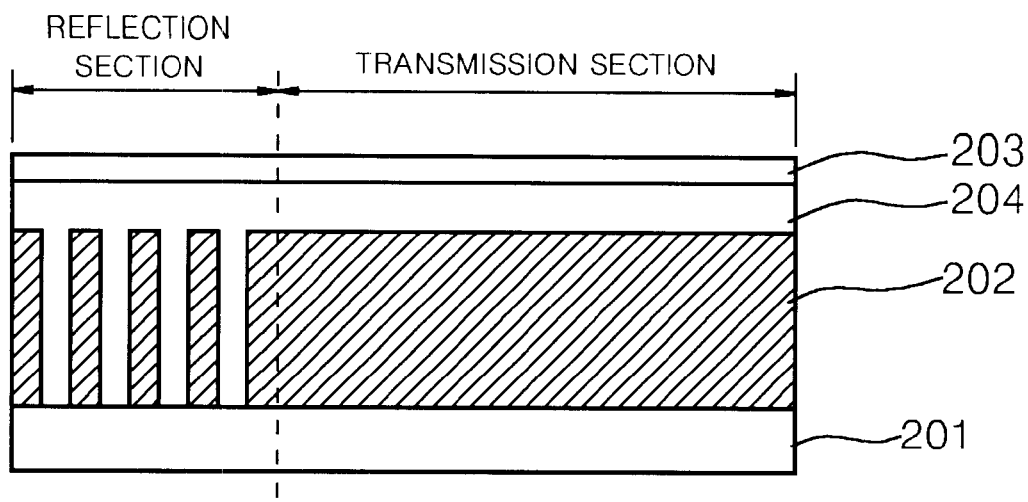
FIGS. 4A and 4B respectively illustrate a cross-sectional view and a plan view of a color filter of a half-reflection-and-half-transmission type liquid crystal display according to a second embodiment of the present invention.
Figure 4B:
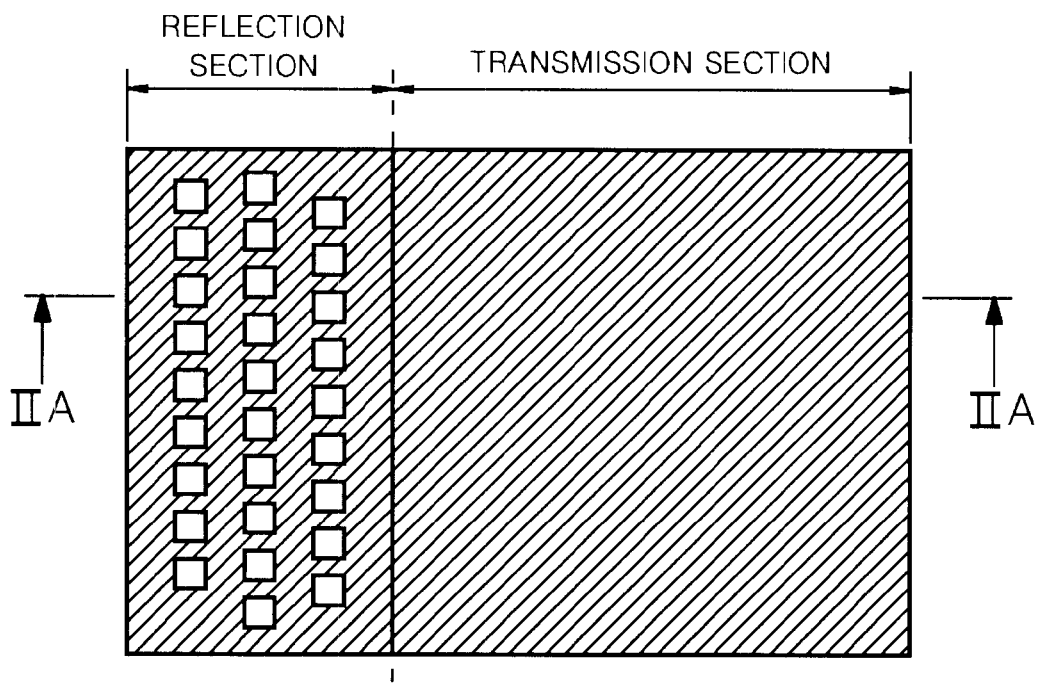

FIGS. 4A and 4B are a cross-sectional view and a plan view of a color filter of a half-reflection-and-half-transmission type liquid crystal display according to a second embodiment of the present invention. In the color filter according to the second embodiment of the present invention, the color resin layer 202 at the reflection section of the color filter has a plurality of recesses, which are areas having no color resin and are filled with the overcoat layer 204.

Alternatively, the reflection section may have a plurality of protrusions. In other words, the recesses are replaced by the color resin layer 202 while the other portion is filled with the overcoat layer. Thus, the color resin layer in the portion corresponding to the reflection section is formed to have a plurality of protrusions, and the overcoat layer is filled in the empty space between the protrusions. The recesses or the protrusions may be formed in a polygonal shape or a circular shape. In FIG. 4A, the recesses exposes the glass substrate 201, it is not required for the embodiment.

A description about operation of the color filter having the color resin layer 202 having the form of the recesses or protrusions is omitted for a simplicity.

A process of manufacturing the color filter in the reflection section will be described as follows.

Initially, the color resin layer 202 is formed on the glass substrate 201. The reflection section of the color resin layer 202 is then patterned by exposure to light to have a plurality of grooves, recesses, or protrusions while red, green, and blue color resins are formed to each corresponding pixel.

In this process, the color resin layer 202 may be completely removed in the grooves and the recesses, thereby exposing the glass substrate 201. Alternatively, it may be partly removed so that a part of the color resin layer 202 may remain on the glass substrate 201.

In order to level the surface of the color resin layer 202 patterned in the grooves, recesses, or protrusions, the overcoat layer 204 is formed on the color resin layer 202. The transparent electrode 203 is then formed on the overcoat layer 204, so that the color filter is completed.

The manufacturing process as described above is relatively simple because it has fewer manufacturing steps in comparison with the conventional manufacturing process of the color filter. Further, instead of adjusting the characteristic of color by forming an acryl resin layer as such in the background art, characteristics of color and the brightness are easily adjusted by partially removing the color resin layer by means of the exposure mask.

Figure 5:
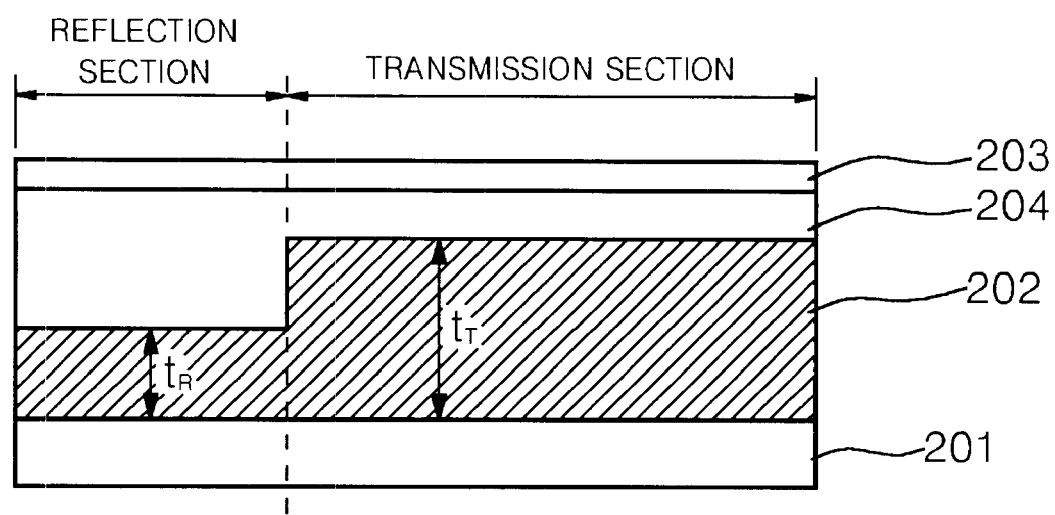
FIG. 5 is a cross-sectional view of a color filter according to a third embodiment of the present invention.

FIG. 5 shows a third embodiment of the present invention. As shown in FIG. 5, a color filter according to the third embodiment of the present invention includes the glass substrate 201, the color resin layer 202, the overcoat layer 204, and the transparent electrode 203. The thickness $t_R$ of the reflection section of the color resin layer 202 on the glass substrate 201 is smaller than the thickness $t_T$ of the transmission section of the color resin layer.

In the color filter of this embodiment, even if light passes through the color resin layer 202 one time at the transmission section and two times at the reflection section, the color resin layer 202 at the reflection section is thinner than the color resin layer 202 at the transmission section. Thus, a distance for light to pass through the color resin layer 202 in one direction at the reflection section is shorter than the distance for the light to pass through the color resin layer 202 at the transmission section. Therefore, characteristics of the reflection section are controlled.

In the process of manufacturing the color filter according to the third embodiment of the present invention, the color resin layer 202 is formed on the glass substrate 201. Thereafter, the reflection section of the color resin layer 202 is half-exposed during the photolithography process. Thus, the thickness $t_R$ of the reflection section becomes smaller than the thickness $t_T$ of the transmission section.

Further, the overcoat layer 204 is formed on the color resin layer 202, so as to level the surface of the color resin layer 202, which has a different thickness between the transmission section and the reflection section. Then, the transparent electrode 203 is formed thereon, so that the color filter is completed.

The process of manufacturing the color filter as described above is simpler than that of manufacturing the color filter in the background art. Further, instead of adjusting the characteristic of color by forming the acryl resin layer as such in the background art, the characteristic of color is easily adjusted by removing portions of the color resin layer through an exposure performed simultaneously with a photolithography step in which the color resin layer is formed.

As described above, in the color filter of a liquid crystal display according to the present invention, the color resin layer at the reflection section may be formed to have a plurality of grooves, recesses or protrusions. The color resin layer at the reflection section may be formed to have a thickness smaller than the thickness of the color resin layer at the transmission section, so that the characteristic of color and brightness at the reflection section can be easily adjusted. Moreover, the manufacturing process is more simplified in comparison with the process of manufacturing the color filter of the background art.

It will be apparent to those skilled in the art that various modifications and variations can be made in the color filter of a liquid display and the method of manufacturing the color filter of the present invention without departing from the spirit or scope of the inventions. Thus, it is intended that the present invention covers the modifications and variations of this invention provided they come within the scope of the appended claims and their equivalents.

What is claimed is:

1. A color filter of a liquid crystal display, comprising:

a glass substrate;

a color resin layer on the glass substrate; and a transparent electrode over the color resin layer, wherein the color resin layer has at least one transmission section and at least one reflection section, and each reflection section has first and second portions, wherein the first portion includes a plurality of recesses and the second portion includes a plurality of protrusions such that the recesses and the protrusions alternate, thereby controlling a quantity of light passing through the reflection section.

2. The color filter according to claim 1, further comprising an overcoat layer for planarizing the color resin layer.

3. The color filter according to claim 1, wherein the second portion has a thickness the same as that of the transmission section.

4. The color filter according to claim 1, wherein the first portion has a shape of one of a polygonal cylinder and a circular cylinder.

5. The color filter according to claim 1, wherein the plurality of protrusions are planarized by an overcoat layer.

6. The color filter according to claim 1, wherein the first portion exposes the glass substrate and the second portion does not expose the glass substrate.

7. The color filter according to claim 6, wherein the first portion is substantially completely filled with an overcoat layer.

8. The color filter according to claim 1, wherein the first and second portion s do not expose the glass substrate and have a thickness different from each other.

9. A liquid crystal display, comprising:

a first glass substrate;

a color resin layer on the first glass substrate;

an overcoat layer on the color resin layer;

a transparent electrode over the color resin layer, wherein the color resin layer has at least one transmission section and at least one reflection section, and each reflection section has first and second portions, wherein the first portion includes a plurality of recesses and the second portion includes a plurality of protrusions such that the recesses and the protrusions alternate, thereby controlling a quantity of light passing through the reflection section;

a second glass substrate facing into the first substrate;

a plurality of wirings for a transistor on the second glass substrate;

a plurality of pixel electrodes on the second glass substrate, and connecting to each wiring through transistor; and a liquid crystal layer interposed between the first and second glass substrates.

10. The color filter according to claim 9, wherein the second portion has a thickness the same as that of the transmission section.

11. The color filter according to claim 9, wherein the first portion has a shape of one of a polygonal cylinder and a circular cylinder.

12. The color filter according to claim 9, wherein the first portion exposes the glass substrate and the second portion does not expose the glass substrate.

13. The color filter according to claim 9, wherein the first and second portions do not expose the glass substrate and have a thickness different from each other.

14. A method of fabricating a color filter of a liquid crystal display on a glass substrate, having transmission and reflection sections, the method comprising the steps of:

forming a color resin layer on the glass substrate;

patterning the color resin layer of the reflection section to have at least one first portion and at least one second portion, wherein each first portion includes a plurality of recesses and each second portion includes a plurality of protrusions such that the recesses and the protrusions alternate, thereby controlling a quantity of light passing through the reflection section;

forming an overcoat layer on the color resin layer to level the color resin layer; and forming a transparent electrode on the overcoat layer.

15. The method according to claim 14, wherein the patterning step is carried out by exposing the reflection section to light simultaneously with the step of forming the color resin layer.

16. The method according to claim 14, wherein the first portion has a shape of one of a polygonal cylinder and a circular cylinder.

17. The color filter according to claim 14, wherein the first portion exposes the glass substrate and the second portion does not expose the glass substrate.

18. The color filter according to claim 14, wherein the first and second portions do not expose the glass substrate and have a thickness different from each other.

* * * * *